July 19, 1932. J. O. HEINZE 1,868,144
PISTON
Filed May 2, 1931
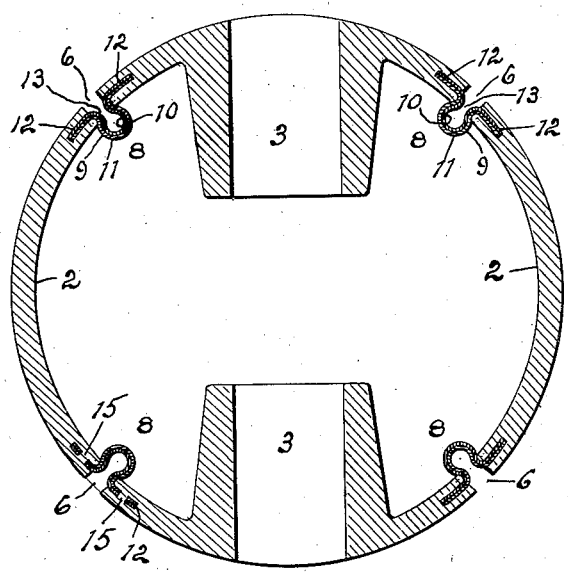
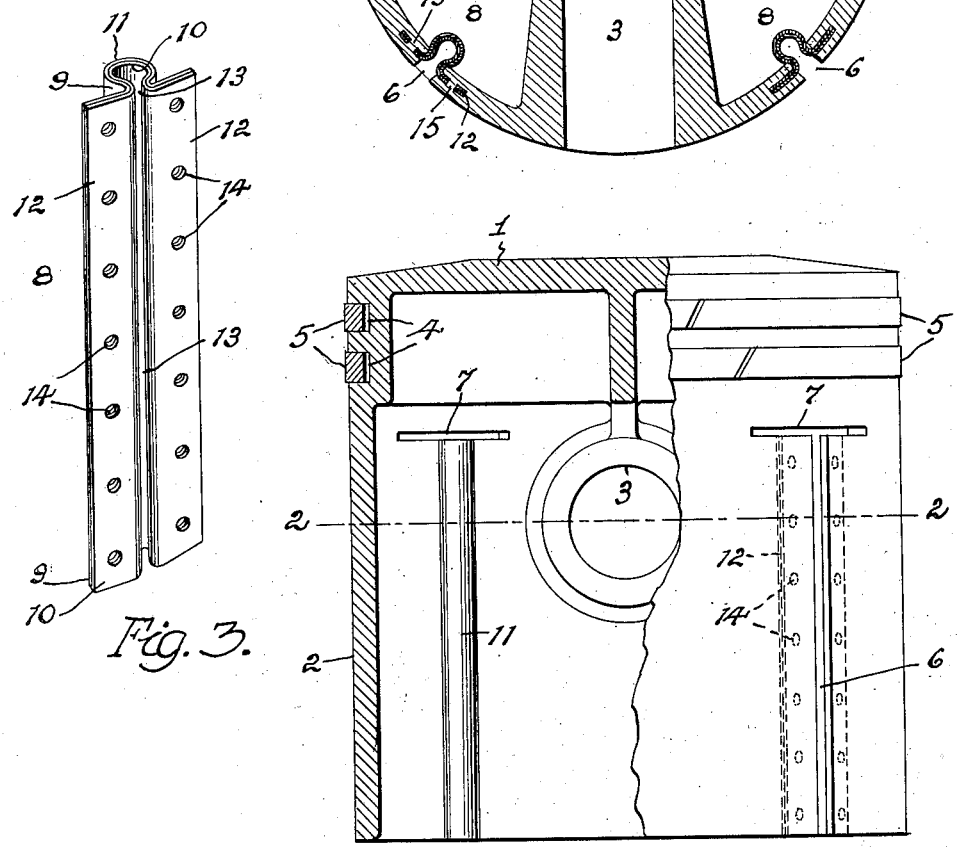

Patented July 19, 1932

1,868,144

UNITED STATES PATENT OFFICE

JOHN O. HEINZE, OF DETROIT, MICHIGAN, ASSIGNOR OF ONE-HALF TO ARTHUR L. CASH, OF MARINE CITY, MICHIGAN

PISTON

Application filed May 2, 1931. Serial No. 534,516.

Pistons, and particularly those used in internal combustion engines are subject to high expansion due to the extreme heat developed in the operation of the engine, and as the cylinders in which the pistons work are usually externally cooled in some manner, there is a difference in expansion between piston and cylinder walls, the piston expanding to a greater degree than the cylinder wall. It is therefore the usual practice to provide for such difference in expansion by making the piston of less diameter than the cylinder, and in some instances, to split the piston skirt so that the divided parts may yield inwardly when the piston expands to a greater degree than the cylinder wall, but this does not wholly remedy the defect, particularly as to what is known as "piston slap" due to the lateral thrust of the connecting rod on the piston which causes a tilting movement of the piston in the cylinder with consequent wear and noise. Further, the piston not fitting snugly in the cylinder bore, piston rings must be wholly depended upon to prevent leakage of gas past the piston with consequent loss of compression and oil pumping or the working of oil up past the piston into the combustion chamber where it will soon form a carbon deposit and cause a knock. Also, in order to reduce inertia, it is of advantage to make pistons as light in weight as possible, and for this purpose they are often formed from an aluminum composition of metal which further increases the difference in expansion between piston and cylinder wall.

The object of the present invention is to overcome these several defects inherent in pistons as commonly constructed, by providing the piston with means whereby its expansion may be controlled as desired, thereby permitting the use of a piston having the desired fit in the cylinder bore and by such control of expansion, maintaining such fit regardless of temperature changes. A further object is to provide a construction embodying no radical changes in the type of piston employed and which is simple in construction and cheap in manufacture.

With the above and other ends in view, the invention consists in providing the piston with one or more temperature responsive elements to be affected by temperature changes and, through the operation thereof, effect either an expansion or a contraction of the piston as desired and according to the construction and arrangement of such element or elements. The invention further consists in the utilization of the difference in expansion of dis-similar united metals to effect such control, and in providing a simple and efficient construction for the purpose, all as hereinafter set forth and more particularly pointed out in the appended claim, reference being had to the accompanying drawing, in which—

Figure 1 is a side elevation of a piston illustrative of an embodiment of the present invention and showing the same partly broken away and in cross section to more clearly disclose the construction;

Fig. 2 is a transverse section substantially upon the line 2—2 of Figure 1; and

Fig. 3 is a perspective detail of a temperature responsive element or device, detached.

The piston head which is indicated as a whole by the numeral 1, is cast in the usual manner from the desired kind of metal with the usual integral skirt 2, wrist pin bearings 3 and grooves 4 for the reception of the usual expansible packing rings 5.

For the purpose of permitting the skirt 2 to expand and contract freely under temperature changes, it is split or slit longitudinally at one or more points, as at 6 and cut transversely for a short distance as at 7, across the upper end of each slit, and secured within and extending across each slit, is a temperature responsive device indicated as a whole by the numeral 8 and shown in Figure 3, preferably extending from end to end thereof.

Each device 8 comprises two thin strips 9 and 10 of sheet metal having different coefficients of expansion, which strips are welded or otherwise intimately united, face to face, and then bent longitudinally to form a central longitudinal spring loop 11 with side edge flanges 12, the loop extending laterally of said flanges and slightly open, providing a narrow longitudinal space 13 between said flanges with the loop connecting said flanges which are provided with a series of openings 14.

If the strip 9 having the greater coefficient of expansion be placed so that it forms the outer surface of the loop 11 as shown, upon a heating up of the strips, this excess of expansion of this strip over that of the strip 10 forming the inner surface of the loop, will cause said loop to close up, lessening the space or opening 13 between the flanges, and therefore, if this temperature responsive device be secured in any suitable manner across the slit or slits in the piston skirt with one flange 12 rigidly secured to one edge portion of the slit and the other flange secured in a like manner to the opposite edge, when the loop 11 projecting inwardly of the wall of the skirt is contracted by heat, it will exert a contracting force on the skirt to provide for the difference in the coefficients of expansion of skirt and cylinder within which the piston moves during the operation of the engine.

The rigid securing of the flanges 12 to the portions of the skirt 2 at each side of each slot, may be accomplished cheaply and with facility, by properly setting these formed strips into the mold in which the piston is cast and pouring the metal in contact with the flanges so that said flanges will be embedded in said portions of the skirt and portions of the molten metal will enter the holes 14 as shown at 15, securely anchoring the strips in place across the slits, said slits being simultaneously formed in the skirt by properly making the mold.

By a proper relative proportioning and placing of the strips 9 and 10, any desired effect of expansion or contraction of the piston skirt may be secured and therefore the piston may be machined to a sliding fit within the cylinder bore, and the difference in expansion between cylinder and piston under working conditions will be controlled by these temperature responsive devices. This comparatively close fit of the piston in the cylinder will to a large extent, eliminate oil pumping and will prevent piston slap at all times. Further, as these strips extend across and close the slits in the piston skirt, splash of oil will get onto the cylinder wall through these slits and work its way up past the piston into the combustion chamber.

Obviously changes may be made within the scope of the appended claims in the form and construction of the temperature responsive devices employed, and these devices may be applied to the piston in any suitable manner. I do not therefore, limit myself to the particular construction and arrangement shown.

Having thus fully described my invention, what I claim is:—

The combination with a piston having a skirt portion divided longitudinally by a plurality of open slits therein, of temperature responsive means each comprising strips of metal placed face to face and united throughout their contacting areas, said strips being formed of metals having different coefficients of expansion and being bent to provide a longitudinally extending loop located centrally of the width of said strips with said loop extending laterally of said strips and with the edges of said loop spaced apart, the portions of the strips at opposite sides of said loop being substantially flat and formed with openings with portions of said skirt at opposite sides of each of said slots engaged in said openings to secure said strips in place in said skirt across and closing said slits with said loops of said strips extending inwardly of said skirt through and closing said slots in said skirt throughout the length of each slit.

In testimony whereof I affix my signature.

JOHN O. HEINZE.